July 15, 1969
A. NYMAN
3,456,072
AUTOMATIC MAPPING DEVICE
Filed Dec. 16, 1946
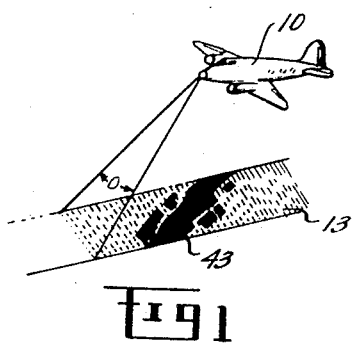
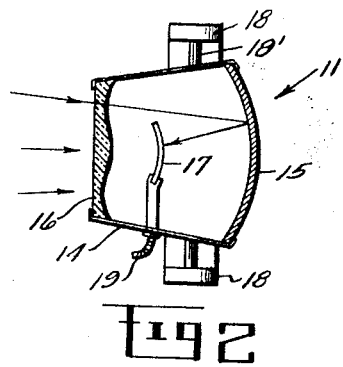
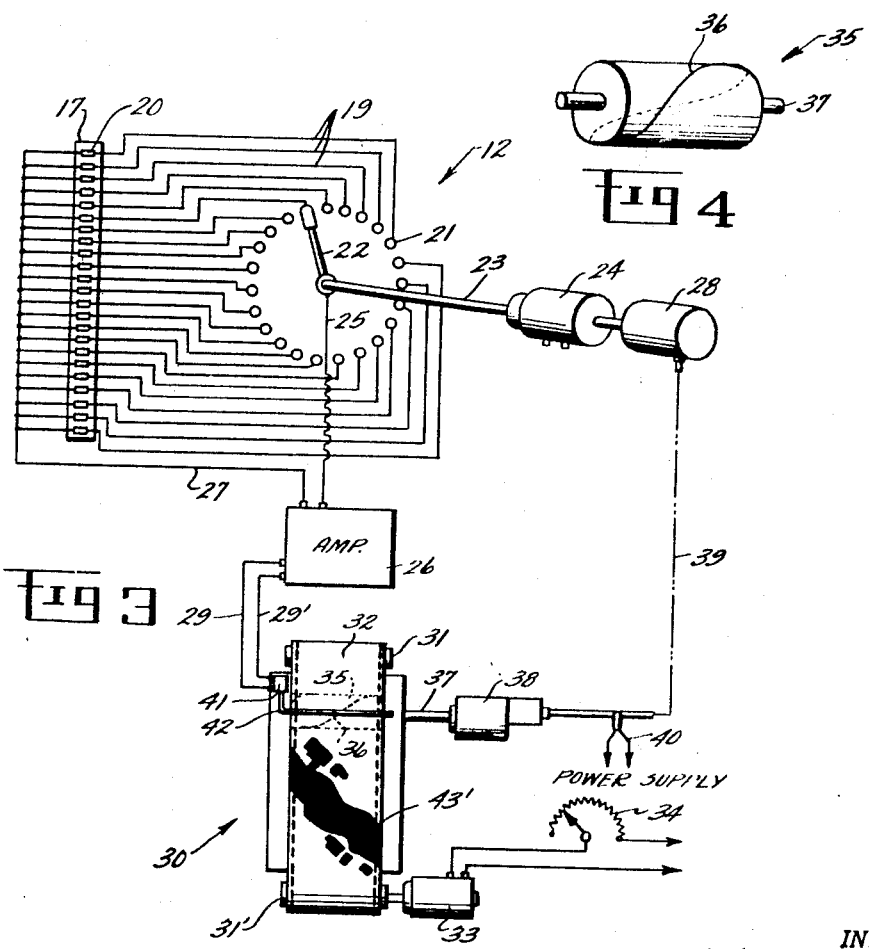
INVENTOR.
ALEXANDER NYMAN
BY Wade Koontz and
Chester Tietig
HIS ATTORNEYS

United States Patent Office 3,456,072
Patented July 15, 1969

3,456,072
AUTOMATIC MAPPING DEVICE
Alexander Nyman, Box 14, Dover, Mass. 02050
Filed Dec. 16, 1946, Ser. No. 716,593
Int. Cl. H04n 5/76, 7/00
U.S. Cl. 178—6.6    6 Claims The invention described herein may be manufactured and used by or for the Government for governmental purposes without payment to me of any royalty thereon.

This invention relates to an automatic mapping device suitable for military and other uses. In warfare it is often desired to locate an objective for bombing when the objective is screened by clouds or darkness. The desired bombing agent may be an airplane or a guided missile.

The device that I have invented makes a continuous maplike presentation showing the areas of the terrain which give off heat. The so called "strip-map" referred to may be made while the airplane carrying the bomb and bombardiers flies over the suspected area. A hot area, for example, a steel works or oil refinery, can then be immediately identified and bombed.

If it is not desired to bomb the located area immediately, the strip-map may be unwound at the military flying base to synchronize with the known speed of a guided missile which has been dispatched to the target. When the strip-map has been unwound to bring the hot area under cross-hairs, for example, the guided missile may be detonated by conventional remote control means.

One object of the invention is the provision of an apparatus capable of mapping terrain automatically from an airplane flying over it to indicate the varying heat emission from the various parts of the terrain or objects lying upon it.

Another object is the provision of a light compact device of the character described.

Another object is to provide a device not using ink or other liquid.

Another object is to provide a device readily convertible to record other radiations instead of heat rays.

Another object is to provide a completely automatic device.

In the drawings:

FIG. 1 shows a perspective view of an airplane flying over a strip of terrain and scanning it within the lines shown as extending from the nose of the aircraft;

FIG. 2 is a vertical section of a heat detector, including its unsectioned vertical mountings;

FIG. 3 is a diagrammatic presentation of the heat detecting elements, the associated scanning or commutator circuit and a plan view of the strip-map recorder; and FIG. 4 is a perspective view of a conductive-helix cylinder used in the strip-map recorder.

In FIG. 1, 10 is an airplane bearing the present device comprising the scanning head 11 housing a heat detector 17 shown in FIG. 2, and the commutator 12 and a recorder 30 producing map black portions 43' on a paper strip 32 shown in FIG. 3. 13 is the strip of terrain which is to be heat-mapped and is being flown over by the airplane 10. The angle of "vision" of the scanning head 11 is the angle O between the lines extending from the airplane 10 to the edges of the strip of terrain.

In FIG. 2, the scanning head 11 comprises a shell 14 having as its rear wall a spherical mirror 15, the inner surface of which reflects light. The front wall is a Schmidt type corrector lens 16, the purpose of which is to distribute uniformly on a detector 17 of heat sensitive elements 20, whatever heat signals are transmitted by objects on the terrain 13. The lens 16 is made of silver chloride or rock salt so that heat signals of 8 to 15 microns wavelength can pass through it. The detector 17 is located at the spherical focus of the mirror 15. The detector 17 has an arcuate form so that it may be on the focal surface. The scanning head 11 is mounted upon horizontal gimbals 18 which are in turn carried on a vertical gimbal 18'. Electric conductors 19 connect the recorder circuit shown in FIG. 3 with the detector 17. Arrows show the direction that heat signals from various angles will take in relation to the scanning head 11. Radiation-sensitive elements are mounted on the rear of the detector 17, thereby forming a mosaic.

The scanning head 11 is preferably gyro-stabilized by the same conventional means as are employed for stabilizing airplane gun platforms, radar sets, etc.

In FIG. 3 is shown a multiplicity of radiation-sensitive elements 20 arranged in a row, as on detector 17. In practice, there may be several rows upon the detector but the connections are as shown in FIG. 3. A conductor 19 connects each sensitive element 20 with a contact 21. The contacts 21 are arranged in a circle so that they may be commutated successively by an arm 22 which is driven by a shaft 23 of an electric motor 24. A lead 25 connects arm 22 by a brush contact to one terminal of an amplifier 26. The other terminal 27 of the amplifier 26 connects with a terminal of each of sensitive elements 20. A selsyn generator 28 is also driven by the motor 24.

The output of amplifier 26 is connected by leads 29 and 29' to a recorder 30. The latter comprises a pair of rolls 31 and 31' over which is fed a strip 32 of Teledeltos or similar current-sensitive paper. A motor 33 drives the roll 31' and is speed-regulatable by a rheostat 34. Recording is obtained by the operation of a cylinder 35 such as shown in FIG. 4. The cylinder is made of nonconducting material, but provided with a conductive helix 36 and a drive shaft 37. The cylinder 35 is rotated preferably under the paper 32 by means of a selsyn motor 38 which is connected to the selsyn generator by a circuit 39 which may be also powered from an outside source 40. At the end of leads 29–29', there is a hinge 41 to which is attached a rodlike loop 42. The current from leads 29–29' traverses loop 42. At the instant that a signal is received from one of the radiation-sensitive elements 20 through amplifier 26, a charge of current will go through the paper 32 to the helix 36, which is grounded to the shaft 37 at some point at the end of the cylinder 35.

The radiation-sensitive elements 20 are preferably bolometers but they may also be thermocouples, thermistors or infra-red sensitive photocells. If it is desired to make the apparatus sensitive to a different sort of radiation, such as visible light, an ordinary autogenerating photocell can be substituted for each sensitive element 20. If it is desired that the apparatus be sensitive to ultraviolet rays only, then photocells sensitive to that wave length range only should be used.

As will be seen from FIGS. 1 and 3, the black portions 43 and 43' correspond. They represent areas where a warm condition has caused signal to be transmitted to one or the other of sensitive elements 20, thereby generating a minute current. The current was commutated by arm 22, amplified by amplifier 26 and made to go through the paper 32 at an instant at which that part of the helix 36 was under loop 42 at that part of its cycle that corresponded to the position of the heated source of signal in relation to the angle O (FIG. 1). The same orientation to the strip 32 was thereby achieved as the original object had to the strip of terrain 13.

It is to be observed that no mechanical oscillation of the scanning head 11 is necessary. The commutating action of the arm 22 takes the place of such oscillation. The forward motion of the airplane supplies one component, the vertical one in relation to strip 32, of the scanning motion. A new method of mapping has therefore been disclosed which can be carried out in other apparatus.

The invention claimed is:

1. In combination, an airplane, and mounted on said airplane a nonoscillating concave mirror adapted to receive radiations from the terrain about to be flown over, a plurality of heat sensitive elements at the focus of said mirror, means for generating an electrical impulse each time said heat sensitive element receives a heat signal, a commutator for collecting the impulses so generated, in predetermined order and means adapted to uniformly advance a strip of electrically sensitive paper, an electrically conductive helix extending crosswise over said paper, said helix being adapted to receive current impulses from said commutator and to be rotated with said paper continuously and to mark same in accordance with the received current impulses to identify heat signals causing said impulses.

2. In a radiation actuable mapping device the combination which comprises a heat radiation detector, a multiplicity of heat radiation sensitive elements within said detector, a nonoscillating optical viewing system for said detector, a commutator, including a revoluble arm, means for driving said commutator, a separate electrical connection between each radiation sensitive element and a segment of said commutator, an amplifier electrically connected to said revoluble arm for amplifying each impulse received through successive commutator segments and a recorder for recording successive amplified impulses on a strip and an aircraft upon which the entire assembly is mounted so that the viewing system faces in the direction of motion of said aircraft.

3. In a mapping device suitable for use in an aircraft, a multiple heat radiation detector, an optical system, including a non-oscillating concave mirror associated therewith for collecting and evenly distributing on said detector, the latter being located substantially at the focus of said mirror, a map recording device, means for connecting successive sensitive elements of said detector to said map recording device whereby signals from successive elements of areas viewed by said optical system will be successively recorded to form a maplike presentation.

4. In combination in a mapping device for mapping a strip of terrain and suitable for mounting in an aircraft, a scanning head which is held substantially in alignment with the terrain to be mapped, a heat detector comprising a multiplicity of independently-functioning heat-sensitive cells within said head, means for distributing evenly over said detector the rays entering said head and falling on the cells of said detector to thereby generate electrical charges therein, independent electrical conductors for transmitting the signal generated in each of the cells of the detector, a switching device for connecting successively each of said conductors in a signal recording circuit, a recorder and means for driving said recorder in synchronism with said switching device whereby to record the signals from the switching device in successive horizontal lines.

5. A mapping device mounted in an aircraft for making an aerial map of the heat radiation of terrain over which the aircraft is in flight comprising a wide angle optical system having a heat sensitive mosaic for receiving a reduced scale optical heat image of the terrain, said mosaic including a plurality of heat detecting elements distributed over the area of said mosaic and adapted to each develop an electrical voltage proportional to the intensity of the heat image on the mosaic at the point of location of each respective element, an electrical voltage amplifier, rapidly rotatable switching means for selectively and sequentially connecting said heat detecting elements to said amplifier, a facsimile recorder having recording elements actuated by the voltage output of said amplifier and including means for advancing an electro-sensitive record sheet relative to said recording elements at a speed proportional to the ground speed of the aircraft, rotatable means for causing movement of said recording elements laterally of said second sheet and means for driving said last named means and said rotatable switching means in synchronism.

6. The process which comprises flying a course over terrain, receiving heat signals from the terrain flown over, converting the received heat signals to proportionate electric pulses, amplifying said pulses and recording said pulses electrochemically in orderly successive lines to make a permanent maplike presentation of the heat characteristics of the terrain flown over during the aforesaid course.

References Cited

UNITED STATES PATENTS

| | | |
|---|---|---|
| Re. 17,712 | 6/1930 | Schmierer. |
| 2,075,808 | 4/1937 | Fliess. |
| 2,170,435 | 8/1939 | Sweeney. |
| 2,176,013 | 10/1939 | Pineo. |
| 2,179,243 | 11/1939 | Ives. |
| 2,227,109 | 12/1940 | Shankweiler. |
| 2,314,800 | 3/1943 | Pineo. |
| 2,306,272 | 6/1945 | Levy. |
| 1,388,105 | 10/1945 | Wilson. |
| 2,403,562 | 7/1946 | Smith. |
| 2,404,064 | 7/1946 | Heigl et al. |
| 2,419,024 | 4/1947 | Iams. |
| 2,453,502 | 11/1948 | Dimmick. |
| 2,458,654 | 1/1949 | Southworth. |

RICHARD MURRAY, Primary Examiner

HOWARD W. BRITTON, Assistant Examiner

U.S. Cl. X.R.

178—6